US009059959B2

(12) United States Patent
Domsalla

(10) Patent No.: US 9,059,959 B2
(45) Date of Patent: Jun. 16, 2015

(54) CLIENT SIDE MANAGEMENT OF HTTP SESSIONS

(75) Inventor: Thorsten Domsalla, Mannheim (DE)

(73) Assignee: SAP SE, Walldorf (DE)

( * ) Notice: Subject to any disclaimer, the term of this patent is extended or adjusted under 35 U.S.C. 154(b) by 399 days.

(21) Appl. No.: 13/276,471

(22) Filed: Oct. 19, 2011

(65) Prior Publication Data

US 2013/0103736 A1 Apr. 25, 2013

(51) Int. Cl.
*H04L 29/08* (2006.01)

(52) U.S. Cl.
CPC .............. *H04L 67/02* (2013.01); *H04L 67/143* (2013.01)

(58) Field of Classification Search
USPC .................................. 709/203, 217–219, 213
See application file for complete search history.

(56) References Cited

U.S. PATENT DOCUMENTS

2003/0009562 A1* 1/2003 Heymann et al. ............. 709/227
2006/0031404 A1* 2/2006 Kassab ......................... 709/218
2007/0300064 A1 12/2007 Isaacs et al.
2009/0037517 A1 2/2009 Frei
2010/0242121 A1 9/2010 Johnson et al.
2010/0299588 A1 11/2010 Dattle et al.
2011/0029393 A1 2/2011 Apprendi et al.
2012/0016726 A1* 1/2012 Mosites et al. ............. 705/14.12

* cited by examiner

*Primary Examiner* — Michael Won
*Assistant Examiner* — Sibte Bukhari
(74) *Attorney, Agent, or Firm* — Schwegman Lundberg & Woessner, P.A.

(57) ABSTRACT

A method is provided for client side management of a client-server HTTP session comprising: sending by a client browser to a server an initial HTTP request; receiving by the browser from the server an initial HTTP response that includes a markup language document, a session identifier and a termination address; creating an iframe within the received initial document; targeting one or more hyperlink objects within the received initial document to the iframe; monitoring for an occurrence of closing the browser or changing an location to which the browser is addressed; and in response to an occurrence of one of the actions, sending by the browser an HTTP request that includes the session identifier to the termination address.

24 Claims, 7 Drawing Sheets

CLIENT SIDE MANAGEMENT OF HTTP SESSIONS

BACKGROUND

The basic architecture of the Internet is relatively simple: web clients running on users' machines use HTTP (Hyper Text Transport Protocol) to request objects from web servers. The server processes the request and sends a response back to the client. HTTP is built on a client-server model in which a client makes a request of the server.

In order to access and use an application over the Internet, a client typically makes a series of consecutive requests to a server that hosts the application. The server responds with a series of consecutive responses containing information, typically in the form of HTML (Hyper Text Markup Language) documents, generated by the application in response to the requests. For example, the server may send an HTML document in response to a client request. A client user then may enter some data based upon the document and submit the data in another request back to the server. The application retrieves the data in the request, processes it and sends a response to the client and so on.

The series of requests and responses is referred to as a 'session'. Each session typically is associated with some unique session identifier such as a number or an alphanumeric value that the client and the server agree upon. The session identifier identifies the request-processing-response blocks as being associated with each other and as being associated with server-side resources allocated to the session such as database locks and memory regions used to store information used by the application to keep track of and to manage processing of requests associated with the session. The server sends the session identifier in its response to the initial client request. In each subsequent request during a given session, the client sends the session identifier as part of the request.

Ordinarily, when the series of consecutive requests from the client to the server ends, the session on the server must be closed in order to release server-side resources allocated to the session. Closing a session involves actions such as to terminating the application, finishing related processing, unlocking and releasing resources and closing the communication channel to the client in order to free all resources and make them available to other sessions and programs. While a user continues to work with an application running on a server the session must not been closed.

Since HTTP is a stateless protocol, it can be difficult to determine when a server should close a session. More particularly, the HTTP protocol is a stateless protocol in that it does not allow permanent connections and does not support a stateful conversation between client and server. Also, since the HTTP protocol supports data transmission in only one direction, i.e. from the client to the server, it contains no mechanism for a client to signal to the server when it has finished sending requests.

Moreover, when a browser uses Dynamic Hyper-Text Markup Language (DHTML) to render the document, there is no difference between unloading a current page or document due to loading a new document into a browser window or due to closing the browser window. A DHTML document is an HTML document enriched with dynamic code such as Javascript and CSS to dynamically change the Document Object Model or handle user actions. Thus, the end of a session typically cannot be identified based upon the closing of a browser window, and typical user interaction with a browser does not readily indicate whether a session should be terminated.

A markup language document (e.g., HTML, XML, DHTML) typically contains content (e.g., text, images etc.) and also contains a description of the layout of and elements on a web page generated to display the document. Elements may include text fields, input fields, buttons, lines and boxes for example. A frame element is used to divide a web page into different blocks each including a separate web page. A frameset document contains one or more frames in some arrangement and acts as a container for frames. A frame or working frame is a window or viewport for a document inside another document (e.g., a window or frame in a browser) Thus, content-containing documents may be displayed within the frames defined in a frameset document. A document is bound to a window, in DHTML terminology, and there is a one-to-one relation between a document and a window.

In the past, a session frameset was created at the start of a new session for use in determining when to end the session. The frameset was used to store the session information and to contain application documents inside of a full-window frame or an iframe. In this manner, the application documents (or pages) within the frameset could change without affecting the session state because the frameset is static and does not change while the user interacts with the application through the documents in the frameset. Server side code ordinarily was required to create and manage a session management frameset.

FIG. 1A is an illustrative drawing representing in general terms a prior system of communications 20 between a client 22 and a server 24 to set up and display a frameset 26. The client 22 sends an initial request 30. In response, the server 24 runs a process 32 to create a session, allocate resources and render a framework frameset 26. The server 24 sends an initial response 34 to the client 22 that includes rendered the frameset 26. The client 22 displays the frameset 26.

FIG. 1B is an illustrative drawing representing in general terms client-server communications in the prior system of FIG. 1A to display frames within the frameset 26. After the frameset 26 has been created, the client 22 sends a request 36 for a frame (e.g. a web page or document) for display within the frameset 26. In response, the server 24 starts an application 28 that renders a frame 38. The server 24 sends a response 40 that includes the rendered frame 38. The client displays the frame 38 within the frameset 26. During the session, the client 22 and server 24 exchange further requests and responses (not shown) to change the frame 38 displayed within the frameset 26. The frameset 26 monitors the client 22 and sends a request (not shown) to release resources upon determining that the session should end.

FIG. 1C is an illustrative drawing representing in general terms the prior system of FIGS. 1A-1B in which a series of additional documents is displayed within the frameset 26. Each successive request-response pair results in a new document frame being displayed within the frameset 26. Each document frame replaces the prior document frame. Thus, the document displayed as a result of Req2-Rsp2 is replaced by the document displayed as a result of Req3-Rsp3, etc.

Unfortunately, implementation of the server side code to render and deliver the frameset often required additional development, administration, file management and maintenance. Furthermore, additional roundtrip communications between client and server often were required at runtime to set up the session frameset.

SUMMARY

In one aspect, a method is provided for client side management of a client-server session during which a client browser sends HTTP requests to the server and the server sends HTTP responses to the client browser. A client browser sends an initial HTTP request to the server for access to an application hosted by the server. The client browser receives from the server an initial HTTP response that includes an initial markup language document, a session identifier and a termination address. In response to receiving the initial document, an iframe is created within the received initial document. One or more hyperlinks within the received initial document are targeted to the iframe. The client browser monitors to detect an event indicating an occurrence of an action closing of the browser or an action directing the browser to a changed address location. In response to detecting an occurrence of the at least one of such actions, sending by the client browser an HTTP request that includes the session identifier to the termination address.

Other aspects will become apparent from the following detailed description, taken in conjunction with the accompanying drawings, illustrating by way of example, the principles herein.

BRIEF DESCRIPTION OF THE DRAWINGS

Some embodiments are illustrated by way of example and not limitation in the figures of the accompanying drawings. Any item shown in a drawing that is identical to or substantially the same as an item shown in another drawing is labeled with the same reference numeral in both drawings.

DESCRIPTION OF THE EMBODIMENTS

The following description is presented to enable a person skilled in the art to create and use a method, system and article of manufacture for client side management of a session involving a web client and a web server. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1A:
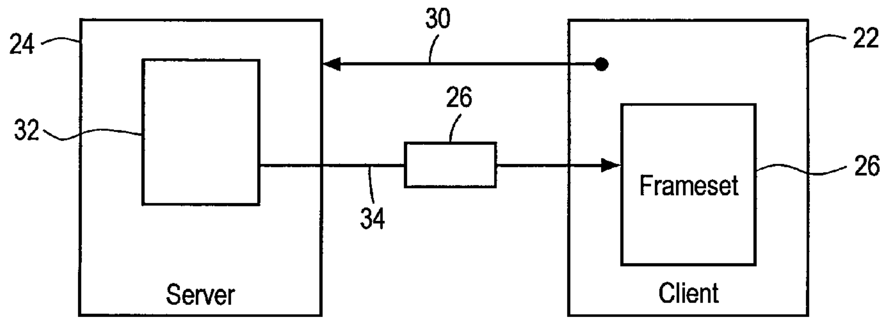
FIG. 1A is an illustrative drawing representing in general terms a prior system of communications between a client and a server to set up and display a frameset.
Figure 1B:
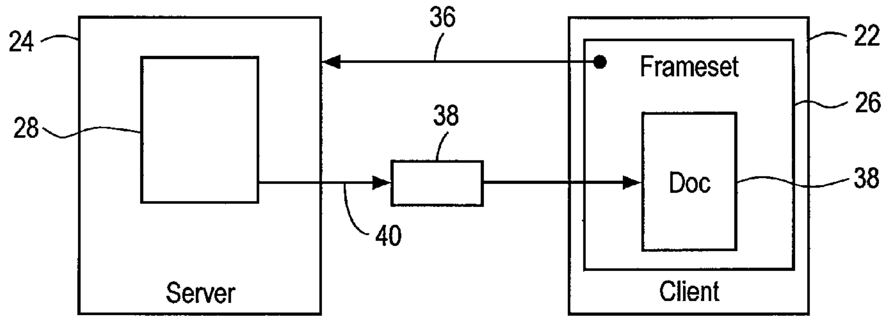
FIG. 1B is an illustrative drawing representing in general terms client-server communications in the prior system of FIG. 1A to display frames within the frameset.
Figure 1C:
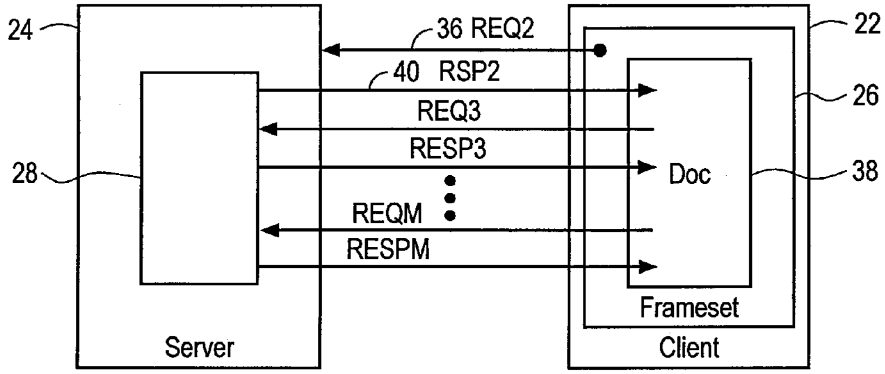
FIG. 1C is an illustrative drawing representing in general terms the prior system of FIGS. 1A-1B in which a series of additional documents is displayed within the frameset.
Figure 2:
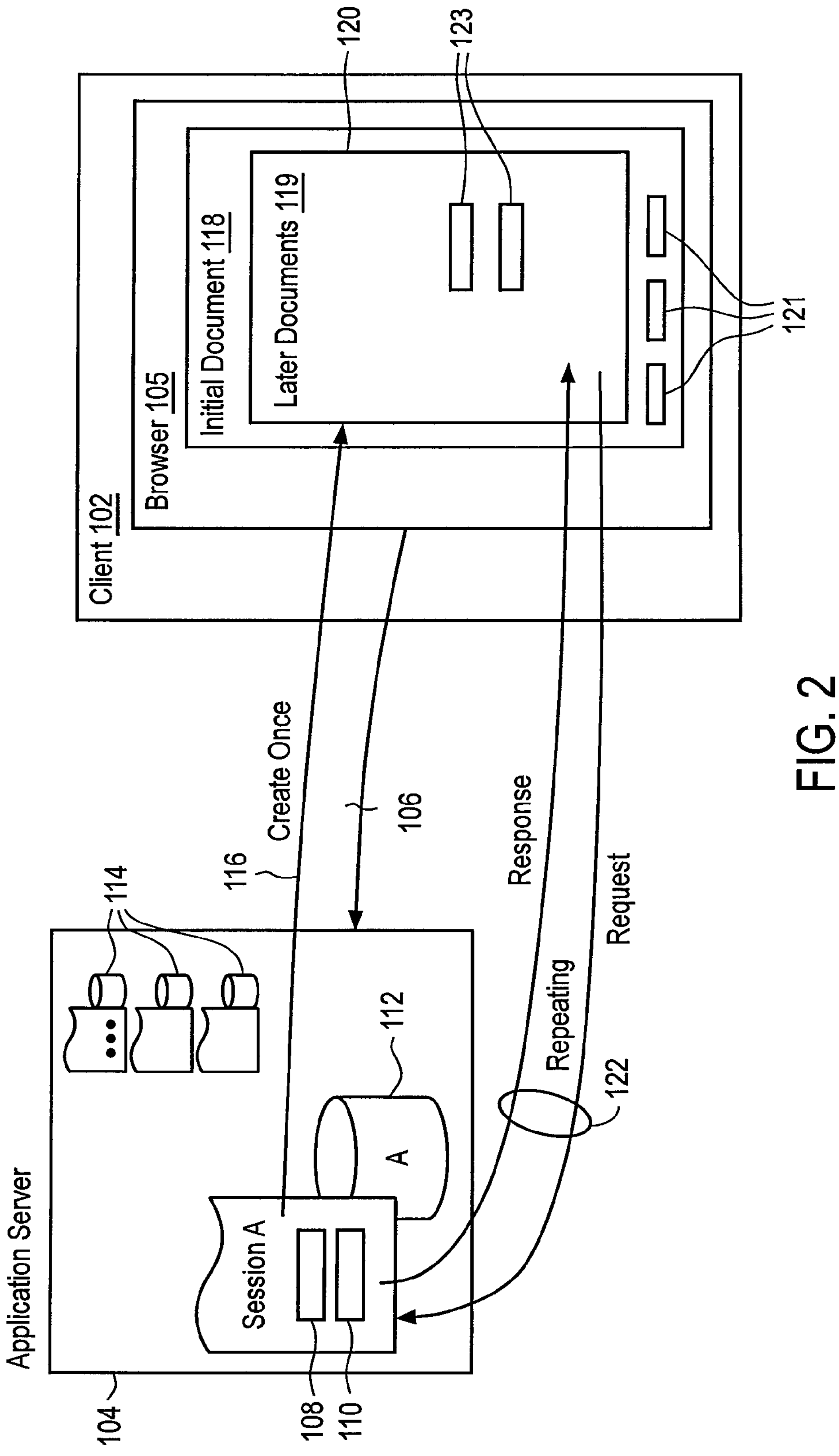
FIG. 2 is an illustrative block diagram of a client-server system showing interaction between a client and a server in accordance with some embodiments.

FIG. 2 is an illustrative block diagram of a client-server system 100 showing interaction between a client 102 and a server 104 in accordance with some embodiments. In this example, the client 102 includes a client browser 105 that runs on the client computer 102. As used here, the term ‘computer’ encompasses a physical device that includes a processor, input/output, and volatile memory. As used here, the term ‘computer’ also encompasses a virtual machine: a virtual device or software implementation of a physical device. Moreover, the term computer encompasses, without limitation, a personal computer (PC), a tablet PC, a set-top box (STB), a Personal Digital Assistant (PDA), cellular telephone, smart phone, or any processing device capable of executing a set of instructions (sequential or otherwise) that specify actions to be taken by that device. As used herein the term ‘browser’ refers at a minimum to an application that uses the HTTP(S) protocol or the like to retrieve information resources from the Internet and make them available for display by a computer.

The client computer 102 including the browser 105 makes an initial HTTP request 106 to the server computer (‘server’) 104 containing an identifier such as an application’s URL to access an application accessible on the server 104. In response to the request, the server 104 creates an instance of the application 108 within a session having an associated session identifier 110 and allocates session resources such as storage 112 and database access. The server 104 simultaneously maintains other sessions 114 with other clients (not shown) each having its own allocated resources.

The server delivers the request 106 to the application 108, which prepares content for an initial HTTP response 116, which the server 104 sends to the client 102. The initial HTTP response 116 includes an application document 118 and information, in the form of a Javascript statement, to load and process a client-side framework. More particularly, the initial response 116 includes first computer readable instructions to configure client 102 to create a working frameset 120 inside document 118. In some embodiments, the working frameset 120 comprises an inline frame (iframe) added to the DOM (Document Object Model) representing a markup language document 118 that the client 102 is able to parse, render and display.

Generally speaking, an inline frame places another markup language document within a parent markup language document. An inline frame can be selected as the target frame for links defined by other elements. A target is a window where a response to a request is forwarded to in order to display document (response) in that particular window. The static document 118 is the parent document to the inline frame 120 in the embodiment disclosed herein.

The response 116 includes target address information such as second computer readable instructions to configure the client computer 102 to cause subsequent additional documents 119 to be targeted to and displayed within the iframe 120 within the initial document 118 (also referred to as the 'static' document).

The response 116 also includes third computer readable instructions to configure the client 102, via the client browser 105, to notify the server 104 when to close the session. In some embodiments, the third, notification, code includes indication of a network location, such as a URL, to send a termination request to.

Table 1 provides an example of first computer readable instructions provided with response 116 shown using Dynamic HTML.

TABLE 1

```
...
<script type="text/javascript" src="mimes/js/cs_sess_fw.js"></script>
...
```

Table 2 provides code of file cs_sess_fw.js of Table 1 that contains a complete generic framework for the working/monitoring frameset 120

TABLE 2

```
If (true !==__cs_sess_fw__)
{
  var oCsSessFW = {
    ...
    Initialize = function ( )
    {
      // initialize the framework
      ...
      // create the frame
      this._appFrame = this.CreateAppFrame( );
      // and set the targets
      this.ReplaceTargets(this._appFrame);
      ...
      // activate "unload" monitoring
      this.ActivateSessionManagement( );
    },
    ...
  };
  oCsSessFW.Initialize( );
  __cs_sess_fw__ = true;
}
```

Table 3 provides an example of second computer readable instructions in class/object oCsSessFW.

TABLE 3

```
...
CreateAppFrame = function ( )
{
  // code for dynamic creation of a new frame f
  ...
},
ReplaceTargets = function ( in_new_frame )
{
  // replace target attribute for all links and forms
  // that refer to "our" web/application server and
  // that do not target another frame
  ...
},
...
```

Table 4 provides an example of third computer readable instructions in class/object oCsSessFW.

TABLE 4

```
...
DisconnectSession = function ( )
{
  // send request to abort current session
  this.lowLevel_sendRequest("SESSION_ABORT");
},
ActivateSessionManagement = function ( )
{
  this.pageDocument.attachEventHandler("unload",
                                        this.DisconnectSession);
},
...
```

The initial document 118 is referred to as the 'static' document since it remains open throughout the session even as additional documents are requested by the client 102 and are delivered by the server 104 for display within the working frameset 120. Responses received from the server 104 that contain new documents are targeted to the working frameset 120. Since the working frameset 120 is an inline frame created within the DOM of the static document 118, that document 118 remains 'static' in that it is not unloaded when subsequent documents are received and displayed within the working frameset 120. The working frameset 120 monitors client requests throughout the session and also monitors closing of the browser window.

During the exchange of requests and responses 122, when a request is sent from the client browser 102 to the server 104, the response is redirected into the newly created working iframe 120. In some embodiments, the iframe 120 takes the substantially the entire display area provided within the browser 105 for the static document 118 and thereby substantially obscures the static document 118. Thus, from a user's perspective the addition of the working frame 120 makes no difference in the appearance of a displayed web page document.

Figure 3:
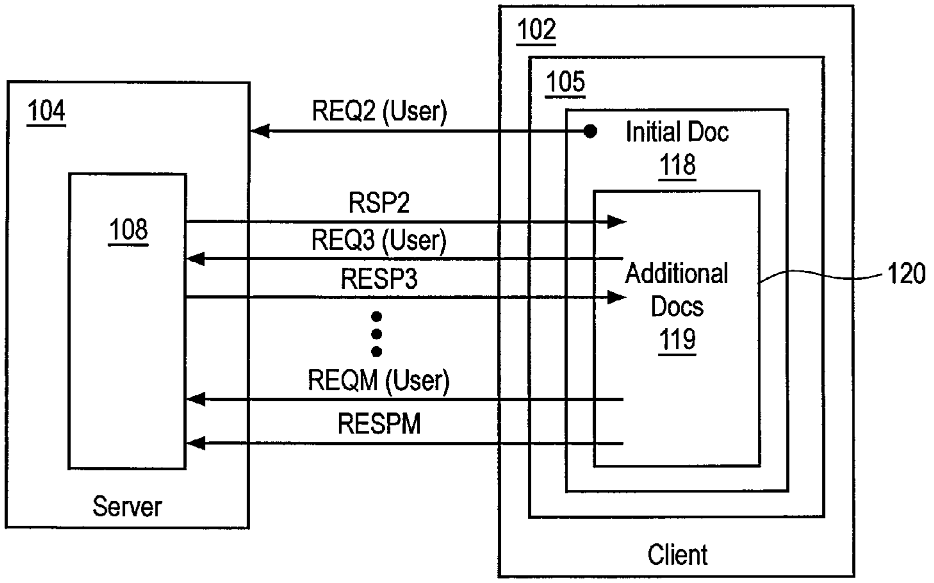
FIG. 3 is an illustrative drawing showing exchange of requests and responses by the client and server of FIG. 2 using a working iframe after the client receives a static document in accordance with some embodiments.

FIG. 3 is an illustrative drawing showing that after the client receives the static document 118, a next document request is sent using a hyperlink 121 in the static document 118, but later additional requests and responses involve hyperlinks in later additional documents displayed in the working frameset 120. Specifically, after displaying the initial document 118, the client 102 sends a next document request Req2 to the application 108 on the server 104 using the static document 118. The response Resp2 to that next request Req2 is targeted to the working iframe 120. Later requests and responses (Req3/Resp2 . . . ReqM/RespM, etc.) occur using hyperlinks 123 in subsequent, later-received, additional documents displayed within the working iframe 120. In some embodiments, each such later received document in a sequence of subsequently received documents substantially is displayed within the iframe 120 and obscures the previously received document in the iframe 120.

Figure 4:
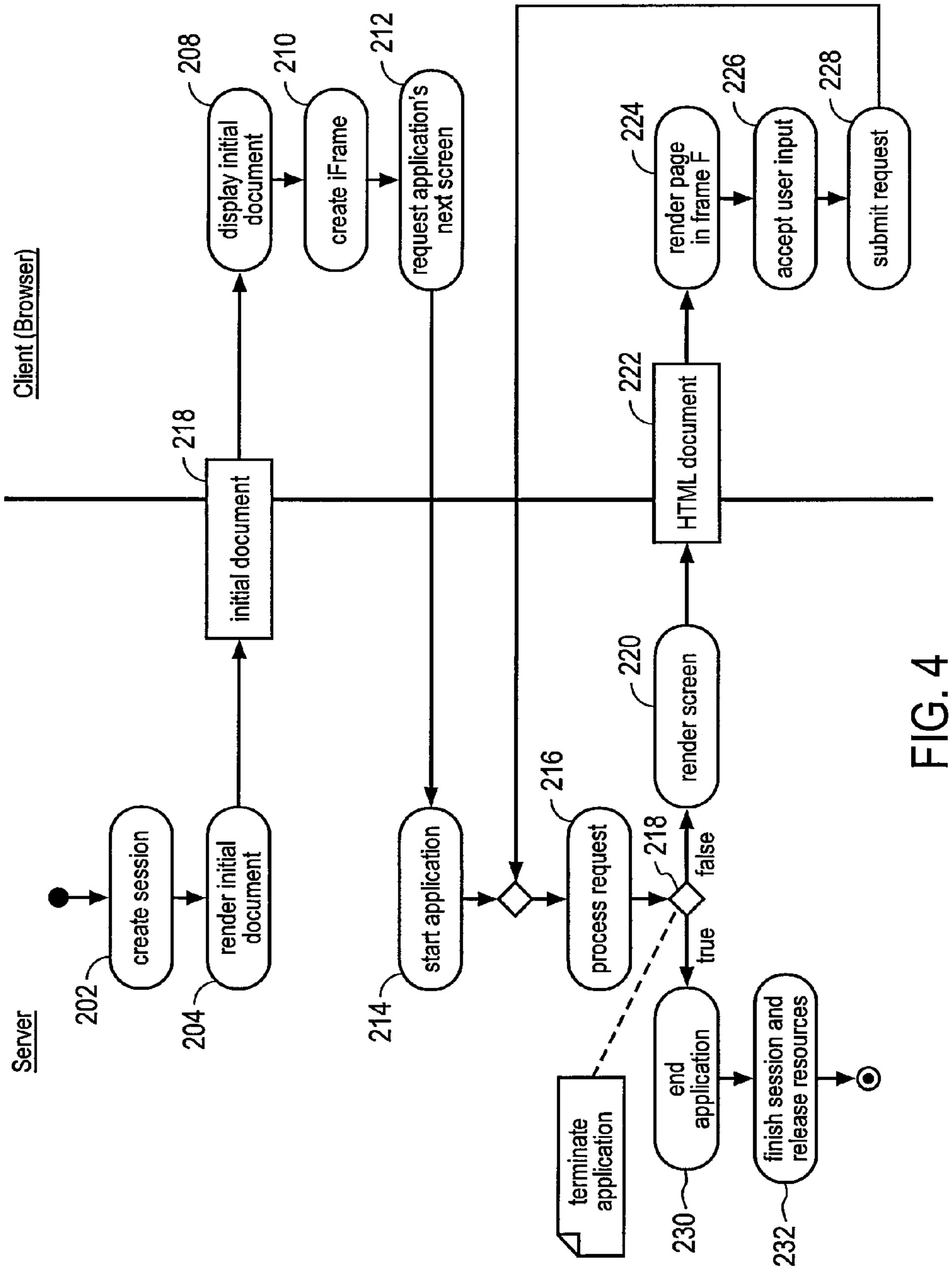
FIG. 4 is an illustrative flow diagram showing a process involving actions performed by the client and by the server to implement the client-server system of FIGS. 2-3 in accordance with some embodiments.

FIG. 4 is an illustrative flow diagram showing a process 200 involving actions performed by the client 102 and by the server 104 to implement the client-server system 100 of FIGS. 2-3 in accordance with some embodiments. The process 200 of FIG. 4 is implemented with computer program code encoded in one or more a computer readable storage devices; modules of the flow diagram represent configuration of a processor of the client computer 102 or server 104 to implement the acts specified for the modules. In response to an initial request (not shown) from the client 102, the server module 202 creates the session involving the client 102 and server 104 as described above. Server module 204 renders the static document 118.

The server 104 sends a response to the client 102 that includes the static document 118. Included in the response to the client 102 is program code described above with reference to Tables 1-4.

Client module 208 displays the initial document 118. Client module 210 creates the working frameset 120. Client module 212 sends to the server 104 a request for the next web page document. It will be appreciated that module 212 may act automatically without additional user input.

Server module 214 starts the application 108, i.e. creates an instance of the server application to interact with the client 102 during the session. Server module 216 processes the 'next' client request. Server decision module 218 determines whether the received request is a termination request. Since this request is not a termination request, server module 220 renders a markup language document 222 in response to the request. It will be appreciated that the processing by server module 216 includes processing by the application 108, and that the document 222 rendered by the server module 220 is rendered as a result of processing by the application 108.

Client module 224 renders the document 222 iframe 120 within the static document 118 within the client browser 105. Module 226 monitors a browser for occurrence of a first action involving closing the browser or closing a browser window or a second action involving a user request for a different web page, for example. As explained more fully below, an occurrence of either such action constitutes an event that triggers termination of the session. Client module 228 sends a request to the server in response to the user input to the client browser 105. The request may include a user request for another web page or may include a termination request, for example.

Server module 216 processes the request. If server decision module 218 determines that the request includes a termination request, then module 230 closes the server application 108, and module 232 ends the session and releases resources as described above. If decision module 218 determines that the request is for another document, then module 220 renders the requested document 222.

Client module 224 renders document 222 into the working frame 120 within the client browser 102. As explained above, in some embodiments the working frame 120 is an iframe that completely hides the view of the initial/static frame 119. From the user's point of view, the server 104 has returned the web page normally. However, it will be appreciated that the initial or static page 118 has not been unloaded, and the program code that accompanied the initial document 118 can be used to monitor user interaction with the client browser 105 and to detect user actions that prompt the sending of a termination request. As additional user input is accepted by client module 226, the process 200 continues to recurse about the loop that includes server module 216 until server decision module 218 detects a termination request.

Figure 5:
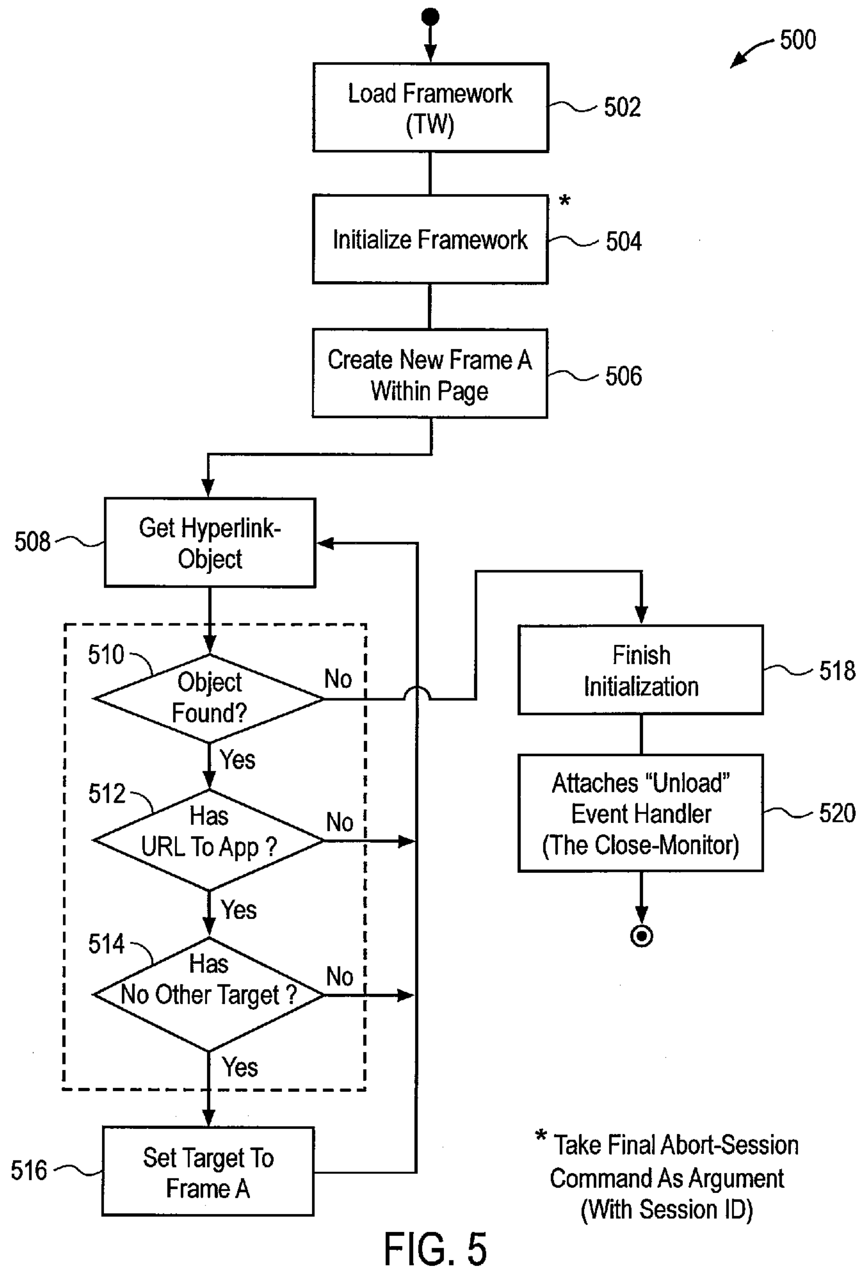
FIG. 5 is an illustrative flow diagram showing details of a process to initialize monitoring for browser events and to set up the working frame in accordance with some embodiments.

FIG. 5 is an illustrative flow diagram showing details of a process 500 performed by client module 210 of FIG. 4 to set up the working frame 120 and to set up a monitoring process in accordance with some embodiments. Computer readable instructions to implement process 500 are included with the initial response 116. Module 502 loads a monitoring framework, which acts as a manager or controller that includes services methods and interfaces used to configure the client 102 to monitor the browser 105 for occurrences of the first and second actions. Once the framework has been loaded, module 504 initializes the framework by setting up internal resources including incorporating the sessionID within the abort command so that the correct session is terminated in response to a termination request.

Module 506 creates the working iframe 120. Modules 508-516 act to redirect all documents requested during the session to the working iframe 120. In general, when a request is launched from a hyperlink in a web page, a response is targeted back to that same web page. Modules 508-516 show the steps to modify all links and forms of the current document in order to redirect the first request initiated by the user to the frame created in step 506. This is done only once at initialization time when document 118 has been completely rendered by the browser ("load" time). Modules 508-516 ensure that responses to requests launched from hyperlinks in the static document 118 are redirected back to the working iframe 120. After responses to requests using links in the static document are redirected to the working iframe 120, responses to additional future requests launched from links in additional documents later displayed within the working iframe 120 will be automatically targeted to the iframe 120.

Module 508 searches for hyperlink objects within the static document 118. When decision module 510 determines that a link object has been identified within the document 118, decision module 512 determines whether the link object has a URL to the application 108. If not, then control flows back to module 508, which searches for another hyperlink object within document 118. It will be appreciated that if a request is launched using a hyperlink object that has a URL to some location other than to the application 108, then the monitor process, described with reference to FIG. 6, will terminate the session.

If decision module 512 determines that the link object does have a URL to the application 108, then decision module 514 determines whether the link has no other target for responses.

It will be appreciated that a hyperlink in a document may explicitly target a response to a different location other than the web page sending the request. If decision module 512 determines that the hyperlink does have other target information, then that other target information is not changed, and control flows back to module 508. In other words, if a target other than the current page is explicitly set for a link then this target should not be changed. Thus, the target of a link is only modified to target frame 120 only if it has targeted the origin frame 118 before. If decision module 512 determines that the hyperlink does not have other target information, then module 516 sets the working iframe 120 as the target for responses to requests launched using the hyperlink. Control then flows back to module 508. When decision module 510 determines that no additional hyperlinks can be found in the static document 118, control flows to module 518, which finishes initialization, which may involve releasing certain resources, set or reset of flags. In some cases, finishing initialization may involve setting a flag to indicate that the framework has been successfully initialized and the writing of log messages and setting runtime status. Module 520 attaches the 'unload' event handler to the close monitor.

Figure 6:
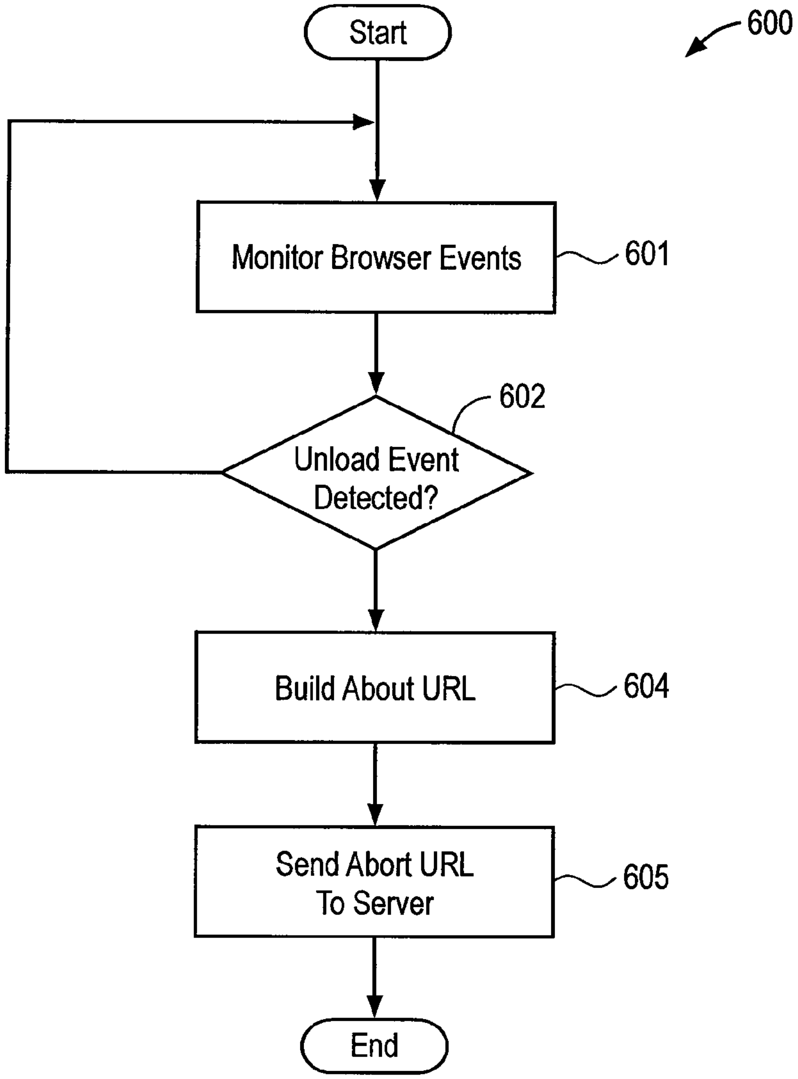
FIG. 6 is an illustrative drawing of a process 600 to send a termination request in response to a browser event in accordance with some embodiments.

FIG. 6 is an illustrative drawing of a process 600 to configure the client browser 105 to send a termination request in response to an occurrence of a first or second browser user actions in accordance with some embodiments. Computer readable instructions to implement the process 600 are included with the initial response 116. The Javascript code described above instructs the browser to send an abort URL upon the occurrence of first or second user actions indicating a termination event. Module 601 configures the client browser 105 to monitor to detect occurrence of a first action in which a user or another framework closes the window or a second action involving entering a new address such as a new URL, indicating a new location to which the browser is addressed, that in turn will close the current document 118. In response to occurrence of either of these actions the browser fires an "unload" event resulting in the unload of document 118. Decision module 602 configures the client browser 105 to determine whether such an unload event has occurred. In response to detecting a termination event, module 604 configures the client 102 to build a request containing an abort URL that is addressed to the web page associated with the application 108 and that provides the session ID for the session to be terminated. Alternatively, a termination request can be built during initialization described with reference to FIG. 5. It will be appreciated that Module 606 configures the client browser 105 to send the termination request to the server 104 using AJAX request, for example. Upon the occurrence of a termination event, the browser continues unloading the document and closes the window or loads the new document requested by the user.

Hardware Embodiment

Figure 7:
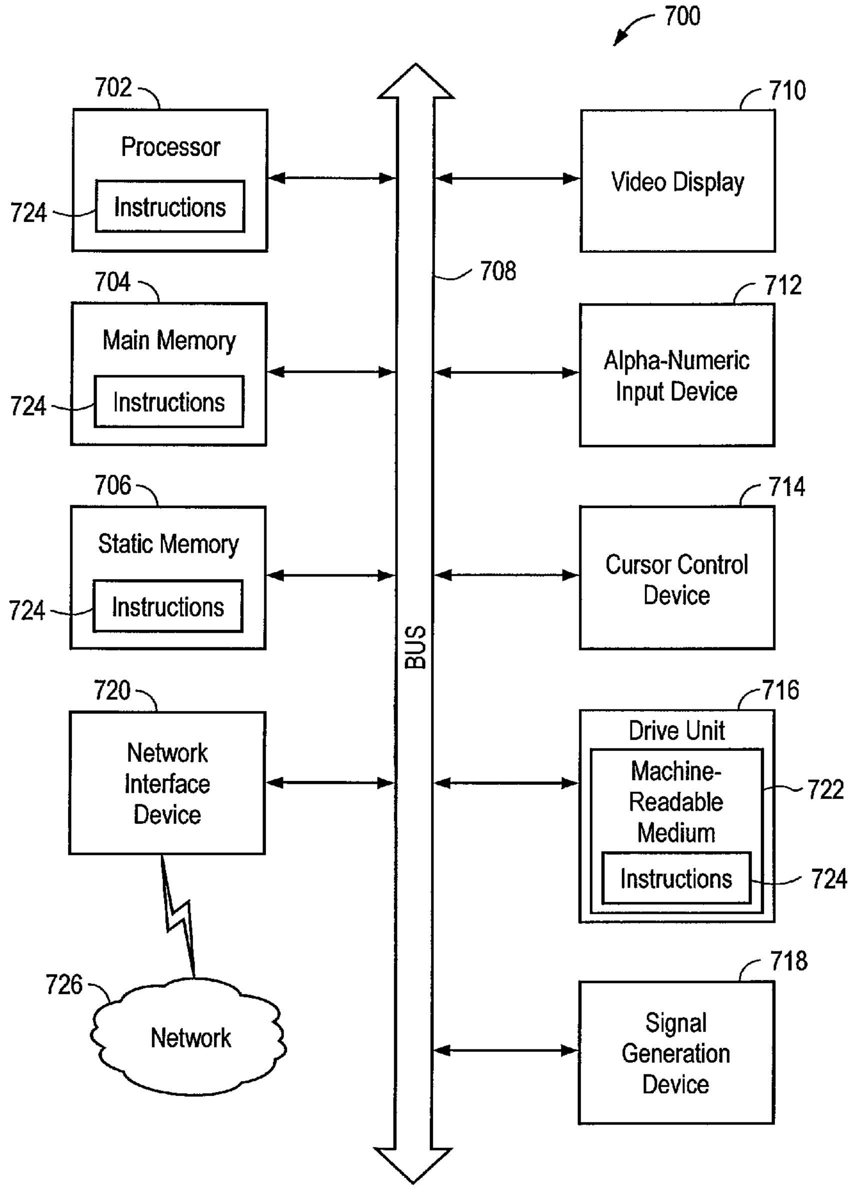
FIG. 7 is a block diagram of a computer processing system within which a set of instructions, for causing the computer to perform any one or more of the methodologies discussed herein, may be executed.

FIG. 7 is a block diagram of a computer processing system within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a Personal Digital Assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 700 includes processor 722 (e.g., a central processing unit (CPU), a graphics processing unit (GPU) or both), main memory 704 and static memory 706, which communicate with each other via bus 1408. The processing system 700 may further include video display unit 720 (e.g., a plasma display, a liquid crystal display (LCD) or a cathode ray tube (CRT)). The processing system 1400 also includes alphanumeric input device 722 (e.g., a keyboard), a user interface (UI) navigation device 714 (e.g., a mouse, touch screen, or the like), a disk drive unit 716, a signal generation device 718 (e.g., a speaker), and a network interface device 720.

The disk drive unit 726 includes computer-readable storage device 722 on which is stored one or more sets of instructions and data structures (e.g., software 724) embodying or utilized by any one or more of the methodologies or functions described herein. The software 724 may also reside, completely or at least partially, within a computer readable storage device such as the main memory 704 and/or within the processor 722 during execution thereof by the processing system 700, the main memory 704 and the processor 722 also constituting computer-readable, tangible media.

The software 724 may further be transmitted or received over network 1426 via a network interface device 720 utilizing any one of a number of well-known transfer protocols (e.g., HTTP).

While the computer-readable storage device 722 is shown in an example embodiment to be a single medium, the term "computer-readable storage device" should be taken to include a single medium or multiple media (e.g., a centralized or distributed database, and/or associated caches and servers) that store the one or more sets of instructions. The term "computer-readable storage device" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable storage device" shall accordingly be taken to include, but not be limited to, solid-state memories, and optical and magnetic media.

While the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method for client side management of a client-server session during which a client browser sends HTTP requests to the server and the server sends HTTP responses to the client browser, comprising:

sending by the client browser to the server an initial HTTP request for access to an application hosted by the server;

receiving by the client browser from the server an initial HTTP response that includes an initial markup language document that includes one or more hyperlink objects, a session identifier and a termination address;

in response to receiving the initial document, creating an iframe within the received initial document;

targeting one or more of the hyperlink objects, which are within the received initial document and outside the iframe, to the iframe;

wherein targeting one or more of the hyperlink objects, which are within the received initial document and outside the iframe, to the iframe includes identifying a hyperlink from among the one or more hyperlink objects, which are within the initial document and outside the iframe, and setting the iframe as a target for responses to requests launched using the hyperlink;

monitoring the client browser to detect an occurrence of at least one browser event; and in response to detecting an occurrence of the at least one browser event, sending by the client browser an HTTP request that includes the session identifier to the termination address.

2. The method of claim 1 further including:

receiving user input requesting to use a hyperlink in the initial document to launch a next HTTP request to the server for access to the application hosted by the server;

in response to the user input, sending by the client browser a next HTTP request to the server for access to the application hosted by the server;

receiving by the client browser from the server a next HTTP response to the HTTP next request; and displaying by the client browser a next document contained within the next HTTP response within the working iframe within the initial document.

3. The method of claim 2 further including:

displaying the initial document; and wherein displaying the next document includes displaying the next document so as to substantially obscure the display of the initial document.

4. The method of claim 1 further including:

receiving user input requesting to use a hyperlink in a document displayed within the iframe to launch an additional HTTP request to the server for access to the application hosted by the server;

in response to the user input, sending by the client browser an additional HTTP request to the server for access to the application hosted by the server;

receiving by the client browser from the server an additional HTTP response to the additional HTTP request; and displaying by the client browser an additional document contained within the additional response within the working iframe within the initial document.

5. The method of claim 4 further including:

displaying the initial document; and wherein displaying the additional document includes displaying the additional document so as to take substantially the entire display area provided within the browser for the initial document and thereby substantially obscure a display of the initial document.

6. The method of claim 1, wherein the initial HTTP response includes computer readable instructions to configure the client to monitor the client browser.

7. The method of claim 6, wherein the computer readable instructions includes JavaScript instructions.

8. The method of claim 1, wherein the initial HTTP response includes computer readable instructions to configure the client browser to send an HTTP request that includes the session identifier to the termination address in response to detecting at least one browser event.

9. The method of claim 8, wherein the computer readable instructions includes JavaScript instructions.

10. The method of claim 1, wherein the initial HTTP response includes first computer readable instructions to configure the client to monitor the client browser for the occurrence of the at least one browser event; and wherein the initial HTTP response includes second computer readable instructions to configure the client browser to send an HTTP request that includes the session identifier to the termination address in response to detecting an occurrence of the at least one browser event.

11. The method of claim 10, wherein the first and second computer readable instructions include JavaScript instructions.

12. The method of claim 1, wherein the at least one browser event is responsive to a first action indicative of closing a browser window associated with the initial document.

13. The method of claim 1, wherein the at least one browser event is responsive to a second action indicative of input to the client browser of a URL causing the initial document to be unloaded from the browser.

14. The method of claim 1, wherein the at least one browser event is responsive a first action indicative of closing a browser window associated with the initial document; and wherein the at least one browser event is responsive to a second action indicative of input to the client browser of a URL causing the initial document to be unloaded from the browser.

15. A method for client side management of a client-server session during which a client browser sends HTTP requests to the server and the server sends HTTP responses to the client browser, comprising:

sending by the client browser to the server an initial HTTP request for access to an application hosted by the server;

receiving by the client browser from the server an initial HTTP response that includes an initial markup language document that includes one or more hyperlink objects, a session identifier and a termination address;

wherein the initial HTTP response includes computer readable instructions to configure the client browser to monitor for the occurrence of at least one of a first action and a second action;

wherein the initial HTTP response includes computer readable instructions to configure the client browser to send an HTTP request that includes the session identifier to the termination address in response to detecting at least one browser event;

in response to receiving the initial document, creating an iframe within the received initial document;

targeting one or more of the hyperlink objects, which are within the received initial document and outside the iframe, to the iframe;

wherein targeting one or more of the hyperlink objects, which are within the received initial document and outside the iframe, to the iframe includes identifying a hyperlink from among the one or more hyperlink objects, which are within the initial document and outside the iframe, and setting the iframe as a target for responses to requests launched using the identified hyperlink;

monitoring by the client browser to detect the first action indicative of closing a browser window associated with the initial document;

monitoring by the client browser to detect the second action indicative of input to the client browser of a URL causing the initial document to be unloaded from the browser; and in response to detecting at least one of either the first action or the second action, sending by the client browser an HTTP request that includes the session identifier to the termination address.

16. An article of manufacture that includes a non-transitory computer readable storage device that stores program code to configure a browser within a computer system to perform a process comprising:

creating an iframe within a received initial document that includes one or more hyperlink objects;

targeting one or more of the hyperlink objects, which are within the received initial document and outside the iframe, to the iframe;

wherein targeting one or more of the hyperlink objects, which are within the received initial document and outside the iframe, to the iframe includes identifying a hyperlink from among the one or more hyperlink objects, which are within the initial document and outside the iframe, and setting the iframe as a target for responses to requests launched using the identified hyperlink;

displaying a different document within the iframe within the initial document;

monitoring to detect an occurrence of a first action indicative of closing a browser window associated with the initial document;

monitoring to detect an occurrence of a second action indicative of input to the client browser of a URL causing the initial document to be unloaded from the browser; and in response to detecting an occurrence of the at least one of the first action and the second action, sending by the client browser an HTTP request that includes the session identifier to the termination address.

17. A system that includes:

a computer system configured to implement a client browser configured to, create an iframe within a received initial document, wherein the initial document, which includes one or more hyperlink objects that are outside the iframe and to target one or more of the hyperlink objects, which are within the received initial document and outside the iframe, to the iframe;

wherein targeting one or more of the hyperlink objects, which are within the received initial document and outside the iframe, to the iframe includes identifying a hyperlink from among the one or more hyperlink objects, which are within the initial document and outside the iframe, and setting the iframe as a target for responses to requests launched using the identified hyperlink;

display a different document within the iframe within the initial document;

monitor to detect an occurrence of a first action indicative of closing a browser window associated with the initial document;

monitor to detect an occurrence of a second action indicative of input to the client browser of a URL causing the initial document to be unloaded from the browser; and in response to detecting an occurrence of the at least one of the first action and the second action, send an HTTP request that includes the session identifier to the termination address.

18. The system of claim 17, wherein the client browser is configured to display a sequence of different documents within the iframe within the initial document.

19. The method of claim 1, wherein targeting one or more of the hyperlink objects within the received initial document to the iframe includes:

identifying a hyperlink, which is within the initial document and outside the iframe, that is targeted to the application; and in responses identifying a hyperlink, which is within the initial document and outside the iframe, that is targeted to the application, setting the iframe as the target for responses to requests launched using the hyperlink.

20. The method of claim 1, wherein targeting one or more of the hyperlink objects, which are within the received initial document and outside the iframe, to the iframe includes:

identifying a hyperlink within the initial document that is targeted to the application;

determining whether the identified hyperlink has another target; and in responses identifying a hyperlink, which are within the received initial document and outside the iframe, that is targeted to the application and determining that the identified hyperlink has no other target, setting the iframe as the target for responses to requests launched using the hyperlink.

21. The article of claim 16, wherein targeting one or more of the hyperlink objects, which are within the received initial document and outside the iframe, to the iframe includes:

identifying a hyperlink within the initial document that is targeted to the application; and in responses identifying a hyperlink that is within the received initial document and outside the iframe and that is targeted to the application, setting the iframe as the target for responses to requests launched using the hyperlink.

22. The article of claim 16, wherein targeting one or more of the hyperlink objects, which are within the received initial document and outside the iframe, to the iframe includes:

identifying a hyperlink, which is within the initial document and outside the iframe, that is targeted to the application;

determining whether the identified hyperlink has another target; and in responses identifying a hyperlink that is within the initial document and outside the iframe and that is targeted to the application, and determining that the identified hyperlink has no other target, setting the iframe as the target for responses to requests launched using the hyperlink.

23. The system of claim 17, wherein targeting one or more of the hyperlink objects, which are within the received initial document and outside the iframe, to the iframe includes:

identifying a hyperlink within the initial document that is targeted to the application; and in responses identifying a hyperlink, which is within the received initial document and outside the iframe and that is targeted to the application, setting the iframe as the target for responses to requests launched using the hyperlink.

24. The system of claim 17, wherein targeting one or more of the hyperlink objects within the received initial document to the iframe includes:

identifying a hyperlink, which is within the initial document and outside the iframe, and that is targeted to the application;

determining whether the identified hyperlink has another target; and in responses identifying a hyperlink that is within the initial document and outside the iframe and that is targeted to the application and determining that the identified hyperlink has no other target, setting the iframe as the target for responses to requests launched using the hyperlink.

* * * * *